United States Patent
Reese et al.

(10) Patent No.: US 9,454,545 B2
(45) Date of Patent: *Sep. 27, 2016

(54) AUTOMATED FIELD POSITION LINKING OF INDEXED DATA TO DIGITAL IMAGES

(71) Applicant: Ancestry.com Operations Inc., Provo, UT (US)

(72) Inventors: Jack Reese, Lindon, UT (US); Shawn Reid, Orem, UT (US); Laryn Brown, Highland, UT (US); Randy Hansen, Lindon, UT (US); Mark Oswald, Cedar Hills, UT (US)

(73) Assignee: Ancestry.com Operations Inc., Lehi, UT (US)

(*) Notice: Subject to any disclaimer, the term of this patent is extended or adjusted under 35 U.S.C. 154(b) by 35 days.

This patent is subject to a terminal disclaimer.

(21) Appl. No.: 14/472,202

(22) Filed: Aug. 28, 2014

(65) Prior Publication Data

US 2014/0369606 A1 Dec. 18, 2014

Related U.S. Application Data

(63) Continuation of application No. 13/601,111, filed on Aug. 31, 2012, now Pat. No. 8,824,803.

(51) Int. Cl.
*G06K 9/00* (2006.01)
*G06F 17/30* (2006.01)

(52) U.S. Cl.
CPC ... *G06F 17/30256* (2013.01); *G06F 17/30011* (2013.01); *G06K 9/00456* (2013.01); *G06K 9/00483* (2013.01)

(58) Field of Classification Search
None
See application file for complete search history.

(56) References Cited

U.S. PATENT DOCUMENTS

| | | | |
|---|---|---|---|
| 5,787,448 A | 7/1998 | Anderson et al. | |
| 6,947,933 B2 * | 9/2005 | Smolsky | G06F 17/30011 707/693 |
| 7,014,101 B1 * | 3/2006 | Kennedy | G06Q 99/00 235/375 |
| 7,174,504 B2 | 2/2007 | Tsao | |
| 2003/0028506 A1 * | 2/2003 | Yu | G06F 17/30336 |
| 2005/0147947 A1 * | 7/2005 | Cookson | G06F 17/30286 434/154 |
| 2005/0149522 A1 * | 7/2005 | Cookson | G06F 17/30292 |
| 2007/0211964 A1 * | 9/2007 | Agam | G06K 9/00161 382/305 |
| 2009/0043824 A1 | 2/2009 | Claghorn | |
| 2009/0154767 A1 * | 6/2009 | Kondoh | G06K 9/68 382/101 |
| 2012/0078503 A1 * | 3/2012 | Dzubay | G06F 17/30241 701/410 |
| 2012/0177291 A1 * | 7/2012 | Gronau | G06K 9/00402 382/190 |
| 2012/0191703 A1 * | 7/2012 | Huff | G06Q 10/063 707/722 |
| 2012/0201457 A1 * | 8/2012 | Bart | G06K 9/00442 382/176 |

* cited by examiner

*Primary Examiner* — Stephen R Koziol
*Assistant Examiner* — Delomia L Gilliard
(74) *Attorney, Agent, or Firm* — Kilpatrick Townsend & Stockton LLP

(57) ABSTRACT

According to one embodiment, a method of linking a document image with indexed data is provided. The method may be performed by providing a document image, which is a digitized document having various information. Indexed data is also provided, which is a record that includes information extracted from the document image or a different document image. The process is further performed by identifying a feature of the indexed data and analyzing the document image to determine whether the feature is present within the information of the digitized document. The feature may be information or a characteristic defined by the information extracted from the document image or the different document image. If the feature is present within the information of the digitized document, a determination is made that the indexed data corresponds with the document image and the indexed data is linked with the document image.

18 Claims, 5 Drawing Sheets

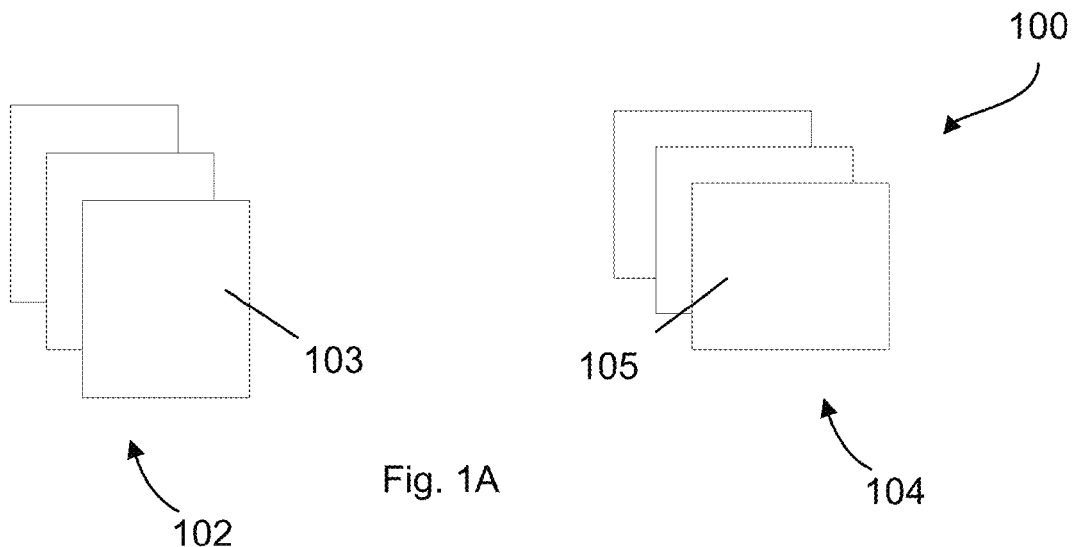
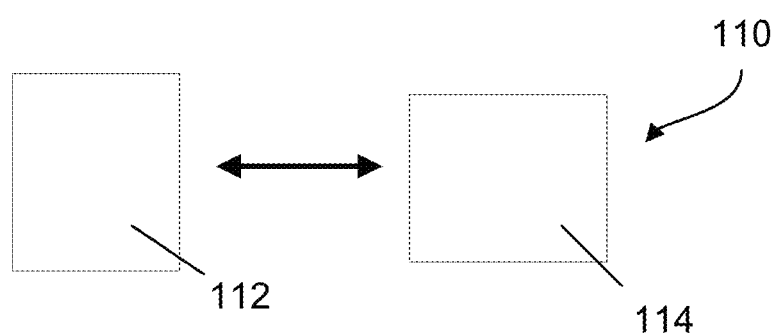

AUTOMATED FIELD POSITION LINKING OF INDEXED DATA TO DIGITAL IMAGES

CROSS REFERENCES TO RELATED APPLICATIONS

This application is a continuation of U.S. application Ser. No. 13/601,111 filed on Aug. 31, 2012, which is hereby expressly incorporated by reference in its entirety for all purposes as if fully set forth herein.

BACKGROUND OF THE INVENTION

The present invention relates generally to methods and systems for linking documents and more specifically to methods and systems for linking document images with corresponding indexed data.

Currently, data-image linking is mainly a manual process that normally involves the use of manual interactive software tools that enable keyed or indexed data sets to be viewed, inspected, and linked or synched up with source images. The process often involves a digitized image being presented to a user along with corresponding keyed data in a sequential manner, requiring the user to verify sequential matches and make manual adjustments where either the data or images are off. There are several problems with current processes. For example, linking or synching image sets to keyed data sets in this manner is a tedious and error prone process.

It is true that in the simplest case where keyed or indexed data is produced from a given set of images, it should not be necessary to link the data to the appropriate images, at least as long as the indexing process is careful to maintain the proper association between the index data and the corresponding image from which that data was keyed. In practice, however, it often becomes advantageous and/or even necessary to link or sync-up indexed datasets to corresponding images.

In industries working with historical documents, which documents may span hundreds of years, the efforts to produce, duplicate, preserve, print, digitize, and the like, the historical documents has increased dramatically over time. Due to the efforts of numerous libraries, archives, and other organizations to preserve these documents from generation to generation, multiple copies of the documents usually exist. Furthermore, the documents often exist in multiple formats. The documents may have originally been handwritten on hand-drawn or machine-printed paper forms. The documents may then have been photographed or microfilmed/microfiched, and duplicated through any number of copies before being ultimately scanned or imaged (i.e., digitized) using a wide variety of modern digital imaging devices. Hence, there are typically many "sources" or copies of the documents or images for a given collection. The quality of the source image in terms of size, resolution, legibility, and the like can vary widely. Furthermore, the possibility of duplicate images, missing images, damaged images, and other such variations between image sets may lead to situations where even the count and sequence of images in these collections is inconsistent.

Meanwhile, multiple organizations continue to work to preserve and provide access to these collections. Therefore, in addition to multiple sources of documents or images, there are often multiple keyed or indexed "datasets" produced from various sets of images for a given collection. Consequently, there frequently exists a many-to-many relationship between "image-sets" and "datasets" for any given collection.

BRIEF SUMMARY OF THE INVENTION

Embodiments of the invention describe methods and systems for linking documents and datasets. According to one aspect, a method of linking a set of document images with an indexed dataset is provided. The method may include providing a set of document images, where the document images are digitized documents having information about individuals, places, or things. The method may also include providing an indexed dataset. The indexed dataset may include data records that each include information extracted or keyed from a document image of the set of document images or a similar set of document images. A first data record may be selected from the indexed dataset. A first feature may be identified from the first data record. The first feature may be defined by a set of the information extracted or keyed from one of the document images. Similarly, a second feature may be identified from the first data record, the second feature being defined by a subset of the information extracted or keyed from the one of the document images. A first document image may be selected from the set of document images. The first document image may be analyzed to determine that the first feature and second feature are present within the information of the first document image. Based on the presence of the first feature and the second feature within the information of the first document image, a determination may be made that the first data record corresponds with the first document image.

The method may additional include selecting a second data record from the indexed dataset. A third and fourth feature may be identified from the second data record, where the third feature is defined by a set of the information extracted or keyed from a different one of the document images and the fourth feature is defined by a subset of the information extracted or keyed from the different one of the document images. A second document image may be selected from the set of document images and may be analyzed to determine that the third feature and fourth feature are present within the information of the second document image. Based on the presence of the third feature and fourth feature within the information of the second document image, a determination may be made that the second data record corresponds with the second document image. The method may additionally include linking at least a portion of the indexed dataset with the set of document images.

According to one embodiment, the document images may be arranged in sequential order and the data records may also be arranged in sequential order. In such embodiments, the method may additionally include: determining a sequential arrangement of the first and second document images, determining a sequential arrangement of the first and second data records, determining a sequential arrangement for each of the remaining document images and data records based on the respective determined sequential arrangements of the first and second document images and the first and second data records, and linking the data records with the document images based on the determined sequential arrangements of the data records and document images.

According to another embodiment, the method may additionally include determining that the indexed dataset is missing a data record or includes a duplicate data record, or determining that the set of document images is missing a document image or includes a duplicate document image, and adjusting the sequential order of the corresponding indexed dataset or set of document images based on the determination. According to another embodiment, the method may additionally include linking the set of document images with a second set of document images based on the step of linking the data records with the document images. The second set of document images may be the digitized documents from which the information for the indexed dataset was extracted or keyed. According to another embodiment, the method may additionally include linking the indexed dataset with a second indexed dataset based on the step of linking the data records with the document images. The second indexed dataset may include information extracted or keyed from the documents of the set of document images.

According to one embodiment, the set of document images may include genealogical documents and the indexed dataset comprises genealogical data. Further, the set of document images may be provided from a first source and the indexed dataset may be provided from a second source that is different than the first source.

According to another aspect, a method of linking a document image with indexed data is provided. The method may include providing a document image, where the document image is a digitized document having information about an individual, place, or thing. The method may additionally include providing indexed data, the indexed data including information extracted or keyed from a different document image. A first feature may be identified from the indexed data and the document image may be analyzed to determine that the first feature is present within the information of the document image. The first feature may be defined by a set of the information extracted or keyed from the different document image. Based on the presence of the first feature within the information of the document image, a determination may be made that the indexed data corresponds with the document image. Subsequently, the indexed data may be linked with the document image.

According to some embodiments, the method may further include: identifying a second feature of the indexed data, the second feature being defined by a subset of the information extracted or keyed from the different document image; analyzing the document image to determine that the second feature is present within the information of the document image; and determining that the indexed data corresponds with the document image based on the presence of the first feature and the second feature within the information of the document image. The first and/or second identified feature may include a recognition of a number of record entries of the document image, a recognition of a sex of an individual or individuals identified on the document image, a handwriting recognition, a strikethrough recognition, a blank field recognition, a table detection, a field detection, word spotting, and the like. According to some embodiments, a number of detected recorded entries for the document image may be adjusted based on a detection or recognition of a strikethrough for an entry.

According to some embodiments, an approximate location on the document image may be known for the information within the indexed data and the method may further include: adjusting the approximate location for the information based on a detection of a blank field, row, or column of information on the document image. According to another embodiment, the method may additionally include: determining a confidence value based on the presence of the first feature within the information of the document image, the confidence value indicating a probability that the indexed data corresponds with the document image, and adjusting the confidence value based on the presence of the second feature within the information of the document image, the adjusted confidence value indicating an increased probability that the indexed data corresponds with the document image. In such embodiments, a third feature of the indexed data may be identified, the document image may be analyzed to determine that the third feature is present within the information of the document image, and the confidence value may be readjusted based on the presence of the third feature within the information of the document image. The third feature may be defined by an additional subset of the information extracted or keyed from the document image.

According to some embodiments, the document image may be received from a first source and the indexed data may be received from a second source different than the first source. Further, the document image may be a digitized genealogical document and the indexed data may be genealogical data.

According to another aspect, a method of linking a first document image with a second document image in provided. The method may include providing a first document image, where the first document image is a digitized first document having information about an individual, place, or thing. The method may also include providing a second document image, where the second document image is a digitized second document having information about an individual, place, or thing. A first feature of the first document image may be identified and a second feature of the first document image may also be identified. The first feature may define or be defined by a set of the information of the first document, or may define an arrangement of the set of information of the first document. Similarly, the second feature may define or be defined by a subset of the information of the first document, or may define an arrangement of the subset of information of the first document. The second document image may be analyzed to determine that the first feature is present within the information of the second document and may be further analyzed to determine that the second feature is present within the information of the second document. Based on the presence of the first feature and the second feature within the information of the second document image, a determination may be made that the first document image and the second document image are digitized forms or versions of the same source document. The first document image may be subsequently linked with the second document image.

Further, the second document image may be linked with a second indexed data record, where the second indexed data record includes information extracted or keyed from the second document image. In such embodiments, the method may further include: linking the second indexed data record with the first document image based on the determination that the first document image and the second document image are digitized forms or versions of the same document, or based on the linking of the first document image with the second document image. Similarly, the first document image may be linked with a first indexed data record, where the first indexed data record includes information extracted or keyed from the first document image. In such embodiments, the method may further include: linking the first indexed data record with the second document image or the second indexed data record based on one or more of the following: the determination that the first document image and the second document image are digitized forms or versions of the same document, the linking of the first document image with the second document image, or the linking of the second indexed data record with the first document image.

BRIEF DESCRIPTION OF THE DRAWINGS

The present invention is described in conjunction with the appended figures:

FIGS. 1A-D illustrate various instances where a document image or a set of document images may be linked with a data record or an indexed dataset according to an embodiment of the invention.

Figure 1C:
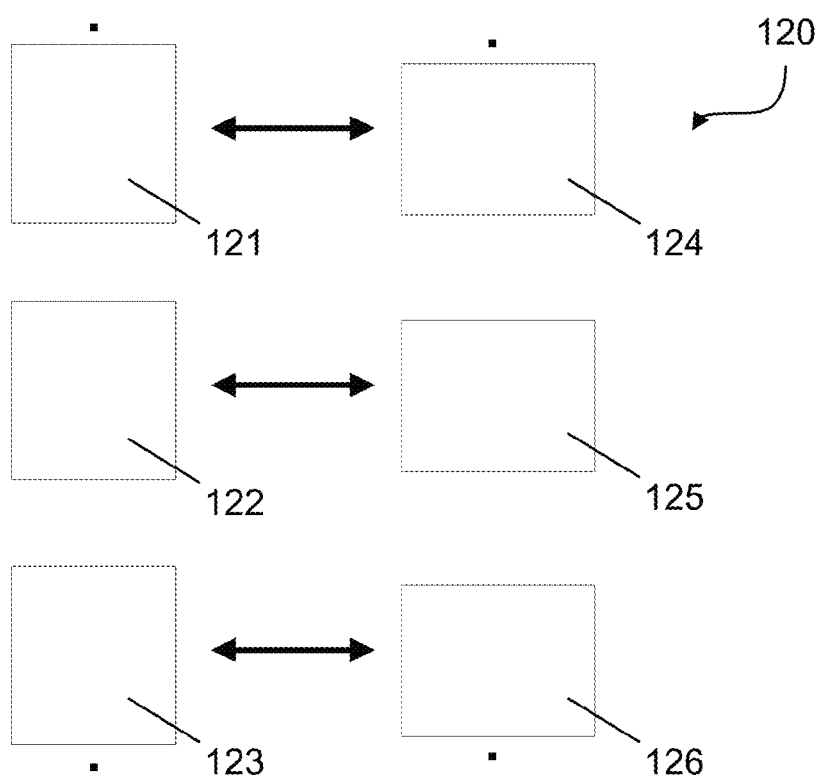

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The embodiments described herein may use the term document image(s), source image(s), digital document(s), and the like. The term generally describes a digitized document or computer readable file that represents any type of document. For example, as described herein, historical documents, or other documents, are routinely digitized by scanning the document, photographing the document, and the like. These documents may include handwritten on hand-drawn documents, machine-printed paper forms, government forms or records (e.g., birth certificate, marriage certificate, census record, and the like), employment or education records, legal records (e.g., a will, contract, and the like), medical records, journals or diaries, and the like. These documents may have been photographed, microfilmed/microfiched, and/or duplicated through any number of processes before being ultimately scanned or imaged (digitized) using a wide variety of modern digital imaging devices. Hence, the term document image refers generally to any digitized image or document. For convenience, the disclosure herein will be mainly directed to document images of genealogical records, however, it should be realized that the disclosure is not limited to such documents.

The embodiments described herein also generally refer to a set or sets of document images, image sets, and the like. These terms generally refer to a plurality of document images, which may be included in a single document or file, or included in multiple separate documents or files. For example, each document image may be included as separate pages within a single document or file, or may be included as separate documents or files altogether. Hence, the sets or sets of document images as described herein are not limited to a specific type unless stated otherwise.

The embodiments described herein also use the term indexed data, indexed data record, data record, and the like. These terms generally describe computer readable files that include information that has been extracted or keyed from a document or document image. For example, as described herein, historical or other documents may be analyzed or reviewed and the information contained therein input, either manually or in an automated fashion, into one or more other documents. A common manner in which this is performed is to have one or more individuals manually enter the information into a separate document, which may or may not have predefined fields for such information. Common documents that are "keyed" in this manner include genealogical records, which may be "keyed" by employees, hobbyists, ancestors, and the like.

The embodiments described herein also generally refer indexed datasets or sets of indexed data or data records. These terms generally refer to a plurality of indexed data records, which like the sets of document images, may be included in a single document or file, or included in multiple separate documents or files. For example, each indexed data record may be included as separate pages within a single document or file, or may be included as separate documents or files altogether. Hence, the indexed datasets are not limited to a specific type unless stated otherwise.

Embodiments described herein also use the term linking to signify a relationship between various documents, records, and the like. This term generally means that some association has been made between the various documents, records, and the like, such as to show a relationship or connection between these documents. For example, a common link that is described herein is a link between a document image and an indexed data record, or between two document images. The linkage may indicate that the indexed data record is connected with or has a relationship with the corresponding document image, such as due to including information obtained from the document image. Other linkages may also be made, such as between two document images to indicate that they are images of the same or similar documents, such as the same source document. Linkages may also be made between two indexed data records to indicate that they include information obtained from the same or similar document images, and the like.

As described herein, a common problem with digitizing documents, especially historical documents, is the possibility of multiple "source" document images, or in other words, multiple copies of the same or similar documents. As can be understood, the quality of these document images in terms of size, resolution, legibility, and the like, can vary widely. Similarly, the indexed data records or datasets that result from the multiple copies may also vary. For example, some documents may have a more complete record of information, or have higher resolution and legibility resulting in a better or slightly different indexed data record. In other instances, a poor quality document image may be linked with a corresponding and relatively high quality indexed data record, while a better quality document image is not linked with any indexed data record at all. Ideally, the highest quality document images may be linked with the highest quality indexed data record so that users may have access to both a high quality document image and a highly accurate indexed data record.

Another common problem is the amount of time and resources that are invested into linking various document images and indexed data records. For example, as described herein, such linkages are often performed manually where a user manually reviews a document image and a corresponding indexed data record and verifies that the image and record match. This process is often taxing on the user and expensive for a company.

Embodiments of the invention describe novel systems and methods that simplify, accelerate, and improve the accuracy of image-to-dataset linking. The systems and methods may also be used to automatically audit, inspect, or validate existing data-image linking associations and to flag possible inconsistencies for subsequent review and correction. The embodiments described herein may use new and/or existing image processing algorithms to perform such processes.

According to one embodiment, the methods and systems are directed toward simplifying, speeding up, and/or automating the task of linking document images with indexed data records. The embodiments may also be used to link the best data records with the highest quality document images. The embodiments described herein leverage image processing algorithms to analyze image information on a document image such as a number of records or fields populated on a page, a detection of blank fields on a page, an identification of strikethrough or crossed out fields and other identifying features, and the like. The embodiments may also utilize handwriting recognition algorithms to detect text from various fields on the page. The handwriting recognition algorithms may detect individual words and/or merely detect various handwriting styles. The algorithms may indicate when a high probability exists that the document image corresponds or matches the data of the indexed data record and the document image and indexed data record may be subsequently linked.

According to some embodiments, handwriting recognition may include recognizing rudimentary handwriting to detect text from various fields on the page and sync, or link to the best probability matches on the keyed/indexed data. Stated differently, highly accurate handwriting recognition is not necessarily required. Rather, simple recognition in constrained domains, such as recognition of gender (M/F), age (0-120), relationship (father, mother, son, daughter, etc.), occupation, and the like, may be all that is needed for effective linking, syncing, and/or matching of indexed data to document images and for estimating the probability that a proposed association is correct.

According to some embodiment, the image processing analysis may be used in addition to, or alternatively, as an effective audit or validation of information extraction or keying results in order to flag likely mismatches. For example, mismatches could be detected where a number of data records in the indexed dataset differ from the document image records detected by image processing algorithms. In another embodiment, a difference in the arrangement of blank cells or strikethroughs could be detected, or a difference in the rudimentary handwriting on selected fields may be recognized.

The embodiments, described herein may also be used for various document search functions. For example, a query could be constructed to request a search of a document image collection to look for and obtain the highest quality image that matches a given set of data parameters. Conversely, an image based search could be constructed to search an indexed dataset for the best data to match the image. For example, a census could be scanned and the best resulting data record delivered to the user based on the scanned image.

As described herein, there are many instances where it becomes advantageous and/or even necessary to "link" or sync-up various indexed datasets to corresponding document images within various image collections. For example, a document image collection may have been initially indexed using a poor set of images and a better set of images may be later discovered. In this instance, it may be desirable to leverage the existing dataset, but "link" or associate each image from the "better" image set with the previously keyed data. According to another example, a keyed or indexed dataset may be licensed or acquired from a $3^{rd}$ party separate from the originally associated document images—possibly due to copyright restrictions, or any number of other reasons. Again, it may be desirable and/or necessary to "link" the acquired dataset to existing images. According to yet another example, a better or more accurate indexed dataset may be found and may need to be linked to a better set of document images. Alternatively, it may be possible and desirable to link or sync the highest quality indexed datasets with the highest quality document images, or even link multiple document images and/or datasets to overcome transcription errors and the like. Stated differently, when multiple indexed datasets are linked to a given set of document images, the likelihood that at least one of the datasets will have a correct transcription for a given transcribed item increases (e.g., a name, date, and the like).

In some instances, significant technical hurdles are overcome in performing the document image/data record verification and linking process. Specifically, the described image processing analysis may be difficult to perform on old, low quality, diverse historical documents, such as old genealogical records, which are often handwritten by different individuals. Most modern document processing technologies are conceived and implemented to work with modern office documents and are not well equipped to handle poor image quality or handwritten documents, such as genealogical or other old records. The challenges in dealing with such documents may be overcome by analyzing features of the document images rather than relying on identifying each written word. For instance, the layout of the document may be recognized, such as the number of entries, blank spaces, strikethroughs, ratio of male/female individuals listed on the page, field code arrangements, occupations, various ages or dates listed, handwriting style, and the like. A non-limiting list of the features of document image that may be analyzed to determine a match or non-match of a selected indexed data record includes:

Handwriting Recognition: according to one embodiment, handwriting recognition may be applied to extract approximate representations of fields on the page. The goal in handwriting recognition may be simply to get some of the characters in some of the fields on the page correct. In some embodiments, the approximate location (e.g., XY coordinates) of the indexed data on a document image may be known or available since the document image, or more likely a similar document image, was previously indexed. Accordingly, handwriting recognition may involve a "fitting" or "registration" problem where the best fit of the known indexed data is computed onto or analyzed with the document image using the approximate location of the data. Techniques such as edit-distance mapping could be employed to "fit" the indexed data on to the "recognized" document image templates. Stated differently, the handwriting recognition could involve more word spotting or handwriting characteristic spotting rather than full word or sentence recognition.

Blank Detection: Some fields on the document image page (or cells in the table) may be left blank. Blank detection could be implemented to detect such blank fields on the page. Further, the indexed data could be shifted (e.g., the approximate data locations could be adjusted) when a blank row or cell is detected to achieve a best/matching fit of the indexed data. Stated differently, the XY position coordinates for the indexed data could be adjusted based on the detection of blank fields. In another embodiment, different document images may be matched and linked by recognizing blanks fields or spaces that are common and unique to each document.

Strikethrough Detection: In some embodiments, crossed out entries in cells and fields can throw off a sequencing or order when attempting to link indexed data to document images. For example, an indexed data record may show one less data entry than the document image since one of the data entries has a strikethrough. Recognition that an entire or row or column has a strikethrough may allow the processing algorithm to adjust the number of data entries recognized and thereby compensate for any data entries that may be missing from the data record. As with blank detection, the purpose of strikethrough detection may be to provide shifting of indexed data fields in order to facilitate recognition or matching of indexed data to the XY image positions of the document image. Having described several embodiments of the invention generally, additional aspects of the invention will be more evident with references to the figures.

Referring now to FIG. 1A, illustrated is a set 100 of similar documents or records that need to be linked or synced together. Specifically, the set 100 includes a set of document images 102 and an index dataset 104. The set of document images 102 includes a plurality of individual document images 103 that may be sequentially arranged and/or linked together. For example, the set of document images 102 may include a plurality of census or other records that are arranged and linked according to alphabetical last name listing, date of creation, or according to any other manner. Each document image 103 is a digital representation or digitized form of a corresponding document, such as a census record and the like. The set of document images 102 may include duplicate document images or may be missing one or more documents or entries. In another embodiment, the document images 103 represent consecutive pages of a newspaper article, journal entry, family tree or other history, medical records, legal records, and the like. Further, each document image 103 may be a separate document, file, or record; may be consecutive pages of a single document, record, or file; or any combination thereof.

Set 100 also includes indexed datasets 104. Like the set of document images 102, the indexed datasets 104 include a plurality of individual data records 105 that may be sequentially arranged and/or linked. Each data record 105 includes information that was extracted or keyed from a document image as described herein. The information may be taken from the set of document images 102 or from another set of document images, with the latter scenario being more common. For example, as described herein, companies often make digital copies of the same or similar document. A specific example involves genealogical related companies obtaining newly released genealogical information (e.g., census information) and digitizing this information. Hobbyists and others involved in genealogy may make similar digital copies. One or more of these groups, or each group, may key or extract information from the digital copies with the result being several digital copies of the same document and several indexed data records obtained from the same document. As can be imagined, the quality of the digital copied documents may vary widely, as may the content of the keyed or extracted information.

In order to obtain and link the highest quality document images (i.e., digital image) with the most accurate indexed dataset, one or more companies or hobbyists may agree to swap document images and indexed datasets. In some embodiments, one company may have the document images while another company has the indexed datasets for those document images. In any event, it is common that the indexed datasets 104 include extracted or keyed data for a given set of document images 102 even though the data was not extracted or keyed from that exact set of document images 102. Further, even though the data may be keyed from the set of document images 102, the individual document images 103 or data records 105 may be out of order with respect to one another. Conventional methods of linking the set of document images 102 with the indexed datasets 104 typically involve manual or semi-manual review of the document images 103 and data records 105.

In another embodiment, the indexed dataset 104 may include information or data that was keyed or extracted directly from the set of document images 102. In such embodiments, it is often desirable or necessary to verify the information that was keyed or extracted for accuracy and/or to make sure that the order and arrangement of the data records 105 corresponds with the order and arrangement of the document images 103. As with linking documents, conventional methods of verifying the data in this manner typically involve manual review of the data records 105 and document images 103.

Referring now to FIG. 1B, an illustration 110 of document linking process is provided. Specifically, FIG. 1B shows a document image 112 being analyzed to verify that the document matches a corresponding data record 114. FIG. 1B further shows the document image 112 being linked 116 with the data record 114 if the match between the two documents is confirmed.

As described herein, data record 114 includes information that is keyed or extracted from a digitally copied document (i.e., a source document). The purpose of the analysis of document image 112 is to confirm that the document image 112 is a digital copy of the same or a very similar source document. For example, data record 114 may include information that was keyed or extracted from a Mar. 5, 1810 census record that begins with an entry for John Smith and ends with an entry for Ted Smith. Document image 112 may be a digital copy of the same census record that was made by another company, a hobbyist, or some other individual or entity. Document image 112 may be analyzed to determine that indeed the documents (i.e., document image 112 and the document from which the information for data record 114 was obtained) both correspond to the Mar. 5, 1810 census record. Upon such determination, the data record 114 and the document image 112 may be subsequently linked 116.

To analyze the document image 112, various features that are common to both the document image 112 and the data record may be identified and analyzed. The common features may include: a number of data entries, a ratio of various information (e.g., a ratio of male to female, children to parents or adults, and the like), a listing of specific occupations, a list of ages, birth dates, place of birth information, hometown listing, physical features, governmental identifies, page numbers, number and/or size of data fields, formatting, handwriting style, font style and size, and/or any other unique or semi-unique feature or characteristic. Virtually anything that is unique or a combination of unique or semi-unique features may be analyzed to make a determination that the documents correspond with the same source document or include the same information.

Since the data record 114 was keyed from a same source document, the data record 114 may also include other details or information about the layout of the source document, which information may also be used to determine if the document image 112 corresponds with the source document. For example, the data record 114 may include table characteristics of the source document or include information about blank or strikethrough data fields, rows, or columns. The document image 112 may be analyzed to determine if the digitized document includes those blank or strikethrough data fields, rows, columns, and the like. The data record 114 may also include information about handwriting style or characteristics, which may be used in making a match. Essentially, the data record 114 may include fingerprint type information that is unique to a corresponding document image, which can be identified and used to match and link the data record 114 with a corresponding document image 112.

In one embodiment, analyzing the document image 112 to determine a match between the document image 112 and the data record 114 involves identifying and analyzing multiple common features. For example, a first common feature of the data record 114 may be identified and the document image 112 may be analyzed to determine whether the digitized document includes the identified first feature. Similarly, a second, third, fourth, and the like number of features may be identified from the data record 114 and the document image 112 may be analyzed to determine if those additional features are present. A confidence indicator or value may be assigned based on the presence of the features and may be adjusted with each verification that an identified feature is or is not present. The confidence indicator could be a value that represents the likelihood or probability that the documents relate to the same source document.

For example, a number of data entries may be identified from the data record 114. The document image 112 may then be analyzed (e.g., using OCR techniques) to determine the number of data entries in the document image 112. If the document image contains the same number of data entries, a confidence indicator could be assigned. The analysis could detect and take into account any strikethrough entries, which may not have been recorded in the data record. In this manner, a false negative could be avoided, which otherwise may occur if strikethroughs are not taken into account. A ratio of the number of males to females could then be identified from the data record 114 and the document image 112 could be analyzed (e.g., using OCR techniques) to determine the ratio of males to females in the digitized document. If the number of data entries and the ratio of male to female matches, the confidence indicator or value could be adjusted to show a higher likelihood that the documents correspond to the same source document. In contrast, if the male to female ratio does not match, the confidence indicator could be lowered. Further, listed occupations and/or the number and ratio of children could be identified from the data record 114 and compared with the document image 112 to determine if the document image 112's information matches the data record 114. Still further, stylistic or organizational features of the source document could be identified from the data record 114 and the document image 112 could be analyzed to determine if those stylistic or organizational features are present. Non-limiting examples of such stylistic or organizational features include blank data fields, table information, handwriting style, data field number and size, column and row headings, and the like.

Any number of features could be identified from the data record and it should be realized that the information is not limited to personal or genealogical information. For example, various prescriptions, dosage amount, medications, past illnesses, and the like can be identified from a medical data record and compared with a digitized copy of a medical record to match the records. Similar logic applies to other documents, which may include legal documents, governmental documents, personal documents, ecclesiastical documents, and the like.

If a match between the document image 112 and the data record 114 is made, such as by the confidence indicator being greater than a defined level, the two records may be associated or linked 116. If a match is not made, the document image 112 or data record 114 may be replaced with a different record, respectively, and the process repeated. The process could be repeated until an appropriate match is found.

As described previously, one application of this process is in searching for an existing document image 112 from a database when a data record 114 is present, or vice versa. For example, if a user has a data record 114 and they would like to obtain a digital copy of the document from which that information was keyed or extracted, the user may key in various features of the document as described above to search for a digital copy of the document. Similarly, if the user has a document, or a digital copy of a document, and would like to obtain a corresponding data record, the user may scan in the digital copied document, photograph the document, or otherwise digitize the document and perform a search for a corresponding data record. The above described method may also be used to validate an information keying or extraction process to ensure that the information is correct and/or that the sequential order of the data record and document image pages match.

Referring now to FIG. 1C, another illustration 120 of a document linking process is provided. Specifically, FIG. 1C shows that a plurality of document images 121-123 are being analyzed, matched, and linked with a plurality of data records 124-126. This process may be more useful in linking a set of document images 102 with an indexed dataset 104. Specifically, a first document image 122 may be compared or matched with a first data record 125 as described above. If the documents match, then a link between the documents may be made. Likewise a preceding document image 121 in a sequentially ordered or arranged image set may be compared with a preceding data record 124 in a sequentially ordered or arranged dataset. If a match is made between the preceding image and data record, 121 and 124, the records may be linked. Further a subsequent document image 123 in the sequentially ordered or arranged image set may be compared with a subsequent data record 126 in the sequentially ordered or arranged dataset. If a match is made between the subsequent image and data record, 123 and 126, the records may be linked. Any desired number of preceding and subsequent images and data records may be analyzed and verified.

In some embodiment, analyzing the preceding and subsequent images and data records may facilitate in determining that a given image and data record, 122 and 125, are indeed related and correspond to the same source document. In another embodiment, verification that the given, preceding, and subsequent images and data records may verify that the set of document images and indexed dataset are order or arranged according to a known sequence and the remaining unanalyzed images and data records may be subsequently linked. To further verify that the images and data records are not out of order, every nth preceding or subsequent image and data record may be compared and verified as described herein. If it is determined that a data record or document image is missing, the sequential arrangement of the dataset or set of document images may be adjusted accordingly.

In yet other embodiment, the described process of verifying preceding and subsequent images and data records may be performed for each image and data record in the respective sets to link the set of document images and indexed datasets together. This process may ensure that linking errors are not made when a dataset and/or set of images contains duplicate or missing documents or records.

Figure 1D:
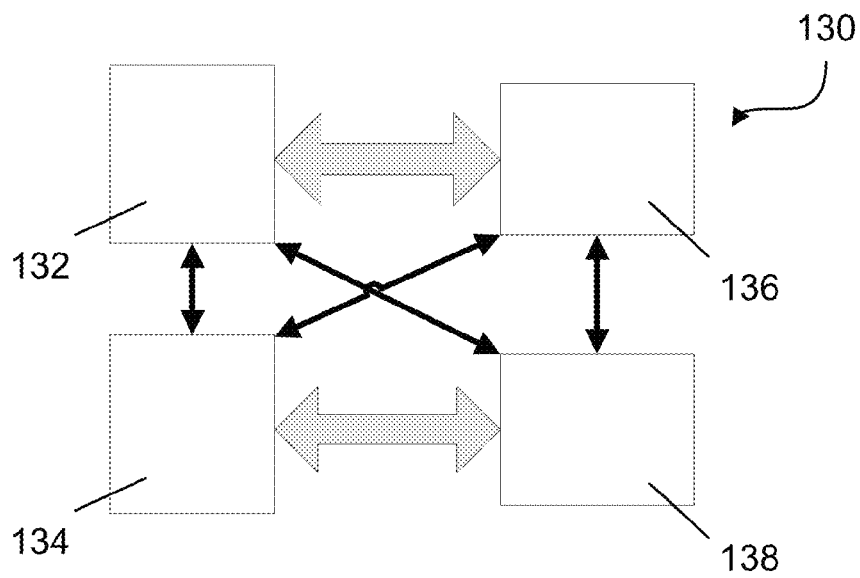

Referring now to FIG. 1D, another illustration 130 of a linking process is provided. In this illustration 130, a first document image 132 may already be linked with a corresponding data record 136 (shown by the large grey arrow). Similarly, a second document image 134 may also be linked with a corresponding data record 138 (shown by the large grey arrow). This situation is common when the data record (e.g., 136) includes information keyed or extracted from a document image (e.g., 132) in a common or single library, such as when a given entity owns the document image and extracts the information to produce a data record and the two records are maintained in the same library. In such instances, it may be desirable to link data records and/or document images in one library with similar data records and/or document images from another library. FIG. 1D illustrates such a process.

These cross library linkages may be made in several ways. For example, the first document image 132 may be compared with the second data record 138 to determine if the records match. If the records do match, a link may be made between the records as shown by the diagonal arrow connecting the records. Based on the match between the first document image 132 and the second data record 138, it may be determined that the first and second document images, 132 and 134, correspond with the same source document and these two document images may be linked as shown by the vertical arrow. It may also be determined that the first and second data records, 136 and 138, similarly match based on the previous matches and these two records may likewise be linked as shown by the vertical error. The second document image 134 may similarly be compared and linked with the first data record 136 and the other records may similarly be matched and linked.

In another embodiment, the first and second document images, 132 and 134, may be analyzed and linked using the processes described herein. For example, the first document image 132 may be analyzed to identify one or more features unique to the first document image, such as handwriting style, formatting, layout, data entries, identified words or text, strikethroughs, blank spaces, data field arrangement, data field size, data field layout, and the like. The second document image 134 may then be analyzed to determine if the digitized document includes these identified features. If a match is made, the first and second images, 132 and 134, can be linked as shown by the vertical arrow and the corresponding data records may likewise be linked as described herein. Since the first and second document images essentially correspond to the same source document, these documents essentially have a unique document fingerprint that can be identified and verified to match the two documents.

Similarly, features of the first and second data records, 136 and 138, can be identified and the records can be compared and matched as described herein and shown by the vertical arrow. The first and second data records, 136 and 138, will likewise have a unique data fingerprint that can be determined and used in matching and linking these records. The corresponding document images may then likewise be linked as described herein.

Figure 2A:
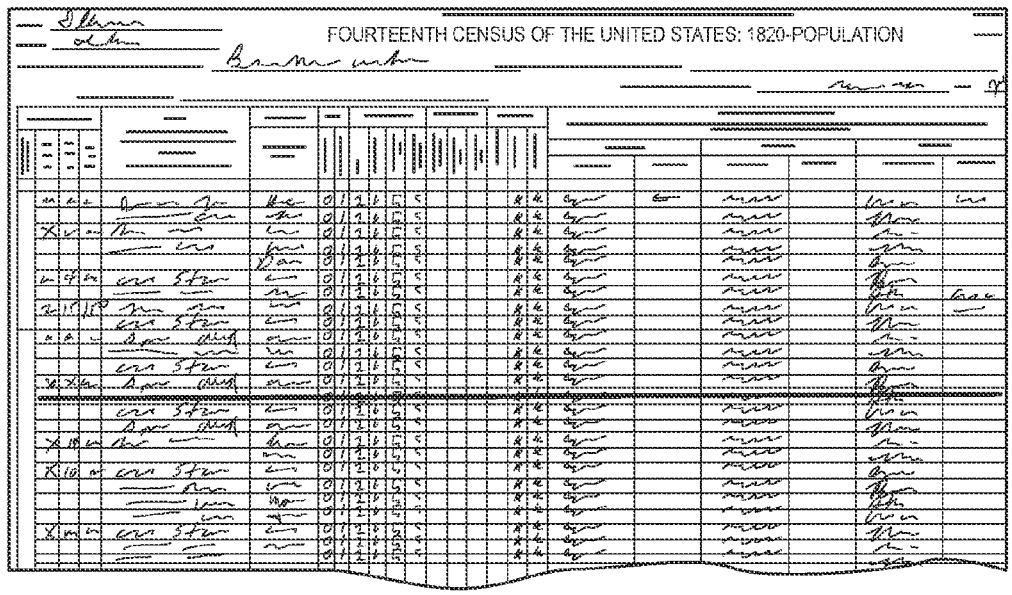
FIGS. 2A & B illustrate various document images according to an embodiment of the invention.

Referring now to FIG. 2A, illustrated is one embodiment of a document image 210 that is a digital representation of a digitized image of a document or record. In this embodiment, the document or record is a historical census document. As shown in the figure, the census was filled out by hand and contains various information about individuals listed on the census record including individuals' names, ages, relationships, and the like. One of the entries has a strikethrough and several of the fields are left blank or have strikethroughs. Some of the letters are relatively illegible or difficult to discern. It is easily understandable that current optical character recognition (OCR) or other imaging software may have a difficult time accurately recognizing each character of the handwritten text. Further, other similar census documents may have been filled out by another individual making OCR even more difficult. As can also be easily understood, the document image 210 has very unique or characteristic features or a document fingerprint, such as the layout, number of data entries, information in the data fields, strikethroughs or blank sections, name information, handwriting style, and the like. These unique features enable the document to be identified as described herein and a match and/or linkage to be made with other document images, data records, and the like. The data record may contain information about one or more of these unique features of document image 210 to enable the matching and linking as described herein. Other documents likewise have unique features or a document fingerprint that enables identification, matching, linking, and the like.

Figure 2B:
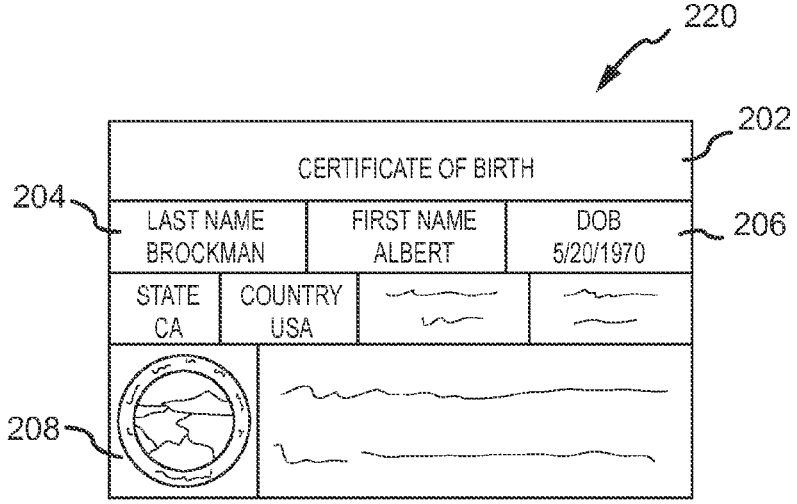

With reference to FIG. 2B, illustrated is a simple representation of another document image 220 that is a digital representation or digitized form of a document. In this embodiment, document image 220 is a simple representation of a birth certificate, although in other embodiments, document image 220 may be any type of document, such as a book, a death certificate, an article, a legal or medical document, a newspaper clipping, a public record, an employee record, sales record, and the like. Document image 220 includes information about an individual, place, or thing, which in this embodiment is information about the birth of an individual. Document image 220 includes a title 202 that identifies the type of document, a last name field 204 that identifies the last name of the identified individual, one or more date fields 206 that show when the document was created and/or when an event occurred (e.g., the date of birth). Document image 220 may also include authentication indicia 208, such as a seal or stamp that verifies the authenticity of the document. The authenticity of the document may be important if questions related to the validity of the information within the document arise, such as when the information within separate documents differ. For example, in a genealogical record, the date of birth of an individual in a birth certificate may differ from the date of birth of the same individual in a family history book. In such instances, the authenticity indicia 208 may be relied upon to verify the date of birth information. Like document image 210, document image 220 also has unique features that enable identification, matching, linking, and the like.

Figure 3:
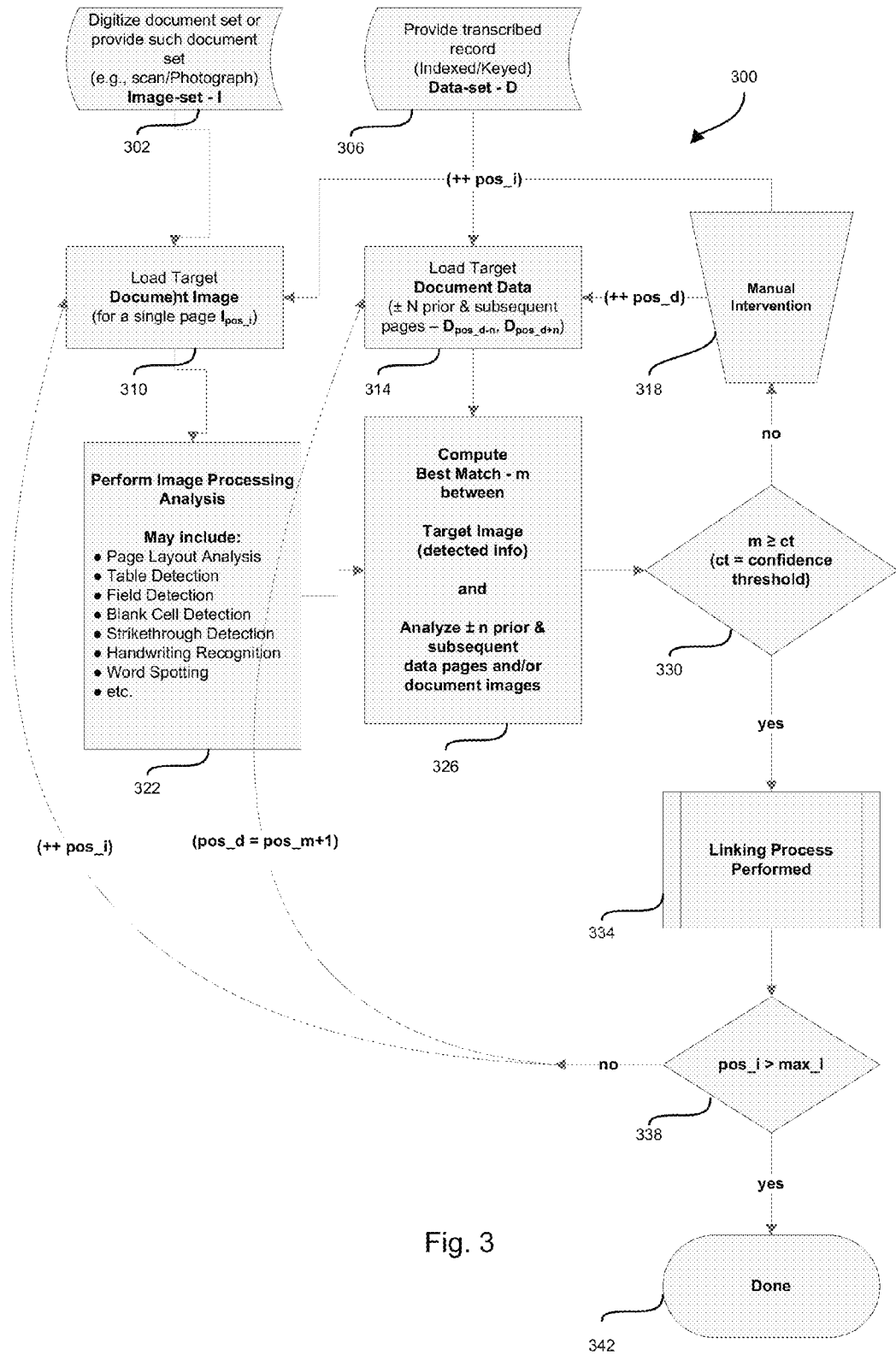
FIG. 3 illustrates an exemplary process flow diagram according to an embodiment of the invention.

Referring now to FIG. 3, illustrated is a diagram 300 of a process for linking a set of document images with an indexed dataset. The process 300 begins at step 302 where document images are digitized, such as by scanning or photographing the documents, or a set of digitized images is provided. The document image set is shown by the designation Image-set I. Similarly, at step 306 an indexed dataset is provided or formed by keying or extracting information from a digitized image, which is typically, but not necessarily, a different digitized image from the ones being analyzed. The indexed dataset is shown by the designation Data-set D. At step 310 a target document image is loaded. The loaded document image is designated $I_{pos\_i}$. At step 314, a target data record is loaded. The loaded data record is designated $D_{pos\_d}$.

At step 322, image processing analysis may be performed as described herein to determine the unique or semi-unique features of the loaded document image. In some embodiments, the image processing analysis may include: page layout analysis, table detection, field detection, blank cell detection, strikethrough detection, handwriting recognition, word spotting, and the like, as described previously. At step 326, a best match analysis may be performed to determine if the loaded document image matches or corresponds with the loaded data record. The computed match between the document image and the data record is designated as m. As described herein the data or information of the loaded data record may be used to determine a match between the two records. A confidence indicator could be calculated based on the match between the document image and the data record. The computed match and resulting confident indicator may be based on one, two, or more compared features of the document image and the data record.

If the match m does not exceed a defined confidence threshold ct, or more precisely, if the compute confidence indicator does not exceed the defined confidence threshold ct, then the documents may not be matched. In some embodiments, when the match or confidence indicator does not exceed the confidence threshold ct, or is relatively close to the threshold, a manual intervention step 318 may be required or performed. This may allow a user to make a final decision as to the relation between the loaded document image and the data record to verify if the records in fact match or not. Thus, the final decision may remain under the user's control, which may be important for old documents, for which image processing may be relatively difficult.

If the ultimate match decision from the manual intervention step 318 is ultimately negative or if step 318 is not performed, another data record (e.g., prior or subsequent data record designated as $D_{pos\_d-n}$ or $D_{pos\_d+n}$) may be loaded at step 314 and the best match analysis may be performed at step 326. This process may be repeated until a matching data record is found or the data records of the indexed dataset (Data-set D) are exhausted. Alternatively, another document image (e.g., prior or subsequent document image designated as $I_{pos\_i-n}$ or $I_{pos\_i+n}$) may be loaded at step 310 and the image processing analysis at step 322 and the best match analysis at step 326 may be performed. This process may likewise be repeated until a matching document image is found or the document images of the set of document images (Image-set I) are exhausted.

If the match m or confidence interval is above the confidence threshold in step 330, the process continues to step 334 where the linking process is performed to link or associate the matching document image and data record. At step 338, a determination is made as to whether the position of the document image or data record is greater than a max position. In other words, a determination is made as to whether the current document is the last record in the indexed dataset (Data-set D) or the last document image in the set of document images (Image-set I). If the document is not the last image or record in either set, the process is repeated and a subsequent target document image is loaded at step 310 and a subsequent target data record is loaded at step 314. If the current document is the last record in the indexed dataset (Data-set D) or the last document image in the set of document images (Image-set I), the process ends at step 342.

Figure 4:
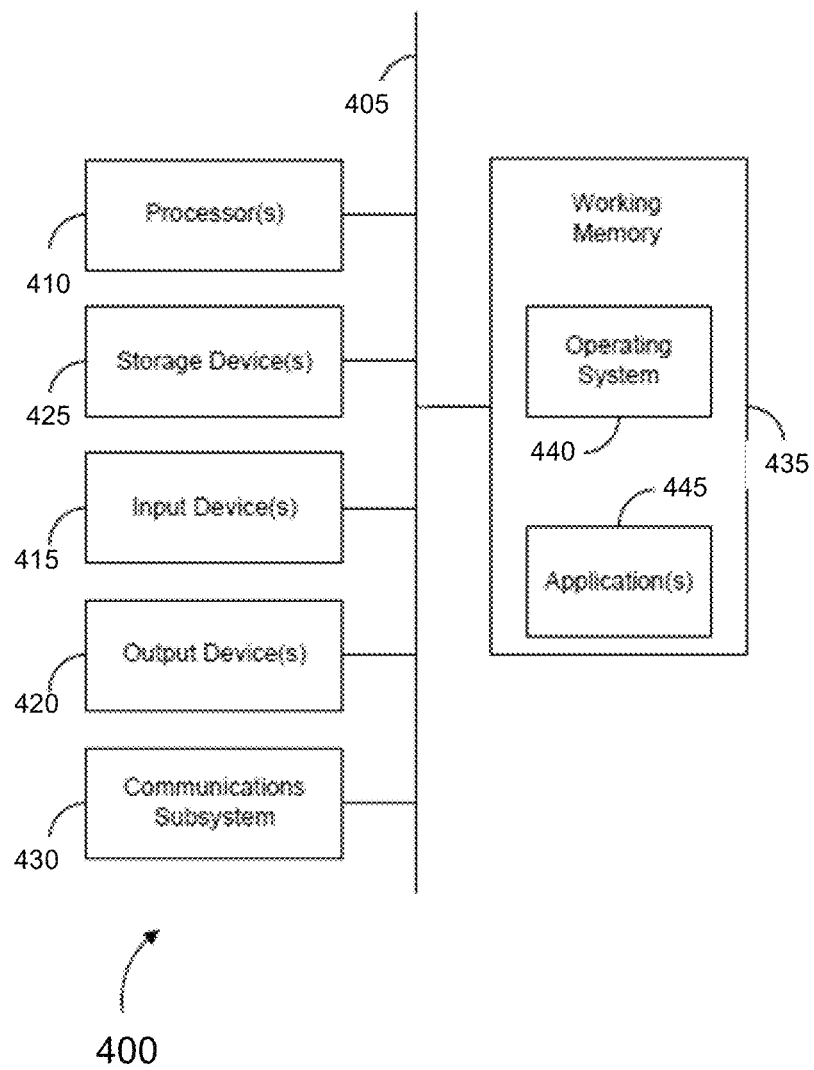
FIG. 4 illustrates a general purpose computer system that may be used to implement the methods described herein according to an embodiment of the invention.

With reference to FIG. 4, illustrated is a schematic of one embodiment of a computer system 400 that can perform the methods of the invention, as described herein. For example, the computer system can function as a system that is able to perform the image processing analysis, best match analysis, linking process, and the like. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including, without limitation, one or more general-purpose processors and/or one or more special-purpose processors (such as digital signal processing chips, graphics acceleration chips, and/or the like); one or more input devices 415, which can include, without limitation, a mouse, a keyboard and/or the like; and one or more output devices 420, which can include, without limitation, a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computer system 400 might also include a communications subsystem 430, which can include without limitation a modem, a network card (wireless or wired), an infra-red communication device, a wireless communication device and/or chipset (such as a Bluetooth® device, an 802.11 device, a WiFi device, a WiMax device, cellular communication facilities, etc.), and/or the like. The communications subsystem 430 may permit data to be exchanged with a network, and/or any other devices described herein. In many embodiments, the computer system 400 will further comprise a working memory 435, which can include a RAM or ROM device, as described above.

The computer system 400 can also comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (e.g., a removable medium, such as a compact disc, etc.), and or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection with other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium," "computer-readable medium," and "computer-readable storage medium," as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire, and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of linking a set of document images with an indexed dataset, in order to link document images as corresponding to the same source document, the method comprising:
   providing a set of document images, the document images being digitized documents having information about individuals, places, or things;
   providing an indexed dataset, the indexed dataset including data records that each include information extracted or keyed from a document image of the set of document images or a similar set of document images;
   selecting a data record of the indexed dataset;
   identifying one or more features of the data record, the one or more features being defined by a set of the information extracted or keyed from one of the document images;
   selecting a first document image of the set of document images;
   analyzing the first document image to determine that the one or more features of the data record are present within the information of the first document image;
   determining that the data record corresponds with the first document image based on the presence of the one or more features within the information of the first document image;
   selecting a second document image of the set of document images;
   analyzing the second document image to determine that the one or more features of the data record are present within the information of the second document image; and
   linking at least a portion of the indexed dataset with both first and second documents in the set of document images, reflecting that the first and second documents correspond to the same source document.

2. The method of claim 1, further comprising:
   selecting a second data record of the indexed dataset;
   identifying a second one or more features of the second data record, the second one or more features being defined by a set of the information extracted or keyed from a different one of the document images;
   determining that the second data record corresponds with the second document image based on the presence of the second one or more features within the information of the second document image;
   determining a confidence indicator based on the presence of a first one or more features within the information of the first document image, the confidence indicator indicating a probability that the first data record of indexed dataset corresponds with the first document image of the set of document images; and
   adjusting the confidence indicator based on the presence of the second one or more features within the information of the second document image, the adjusted confidence indicator indicating an increased probability that the indexed dataset corresponds with the second document image of the set of document images.

3. The method of claim 2, wherein the document images of the set of document images are arranged in sequential order, and wherein the data records of the indexed dataset are arranged in sequential order, and wherein the method further comprises:
   determining a sequential arrangement of the first and second document images;
   determining a sequential arrangement of the first and second data records;
   determining a sequential arrangement for each of the remaining document images and data records based on the respective determined sequential arrangements of the first and second document images and the first and second data records; and
   linking the data records with the document images based on the determined sequential arrangements of the data records and document images.

4. The method of claim 3, further comprising:
   determining that the indexed dataset is missing a data record or includes a duplicate data record; or
   determining that the set of document images is missing a document image or includes a duplicate document image; and
   adjusting the sequential order of the corresponding indexed dataset or set of document images based on the determination.

5. The method of claim 1, further comprising:
   linking the set of document images with a second set of document images based on the step of linking the data records with the document images, the second set of document images being digitized documents from which the information for the indexed dataset was extracted or keyed; or
   linking the indexed dataset with a second indexed dataset based on the step of linking the data records with the document images, the second indexed dataset including information extracted or keyed from the documents of the set of document images.

6. The method of claim 1, wherein the set of document images comprises genealogical documents and the indexed dataset comprises genealogical data.

7. The method of claim 1, wherein the set of document images is provided from a first source, and wherein the indexed dataset is provided from a second source different than the first source.

8. A method of linking a document image with indexed data comprising:
   providing a document image, the document image being a digitized document having information about an individual, place, or thing;
   providing indexed data, the indexed data including information extracted or keyed from a different document image;
   identifying a first feature of the indexed data, the first feature being defined by a set of the information extracted or keyed from the different document image;
   analyzing the document image to determine that the first feature is present within the information of the document image;

determining that the indexed data corresponds with the document image based on the presence of the first feature within the information of the document image;

identifying a second feature of the indexed data, the second feature being defined by a subset of the information extracted or keyed from the different document image;

analyzing the document image to determine that the second feature is present within the information of the document image;

determining that the indexed data corresponds with the document image based on the presence of the first feature and the second feature within the information of the document image;

determining a confidence indicator based on the presence of the first feature within the information of the document image, the confidence indicator indicating a probability that the indexed data corresponds with the document image;

adjusting the confidence indicator based on the presence of the second feature within the information of the document image, the adjusted confidence indicator indicating an increased probability that the indexed data corresponds with the document image; and linking the indexed data with the document image.

9. The method of claim 8, wherein the first feature or the second feature comprises one or more selected from the group consisting of:

recognition of a number of record entries of the document image;

recognition of a sex of an individual or individuals identified on the document image;

handwriting recognition;

strikethrough recognition;

blank field recognition;

table detection;

field detection; and word spotting.

10. The method of claim 9, wherein a number of detected recorded entries for the document image is adjusted based on a detection or recognition of a strikethrough for an entry.

11. The method of claim 9, wherein an approximate location on the document image is known for the information within the indexed data, and wherein the method further comprises adjusting the approximate location for the information based on a detection of a blank field, row, or column of information on the document image.

12. The method of claim 8, further comprising:

determining a third feature of the indexed data, the third feature being defined by an additional subset of the information extracted or keyed from the document image;

analyzing the document image to determine that the third feature is present within the information of the document image; and readjusting the confidence indicator based on the presence of the third feature within the information of the document image.

13. The method of claim 8, wherein the document image is received from a first source, and wherein the indexed data is received from a second source different than the first source.

14. The method of claim 8, wherein the document image is a digitized genealogical document, and wherein the indexed data is genealogical data.

15. A non-transitory computer readable medium having instruction encoded thereon, which when executed by a processor, cause the processor to perform one or more of the following operations, in order to link document images as originating with the same source document:

provide a set of document images, the document images being digitized documents having information about individuals, places, or things;

provide an indexed dataset, the indexed dataset including data records that each include information extracted or keyed from a document image of the set of document images or a similar set of document images;

select a data record of the indexed dataset;

identify one or more features of the first data record, the one or more features being defined by a set of the information extracted or keyed from one of the document images;

select a first document image of the set of document images;

analyze the first document image to determine that the one or more features are present within the information of the first document image;

determine that the data record corresponds with the first document image based on the presence of the one or more features within the information of the first document image;

select a second document image of the set of document images;

analyze the second document image to determine that the one or more features are present within the information of the second document image; and link at least a portion of the indexed dataset with the set of document images, reflecting that the first and second documents correspond to the same source document.

16. The non-transitory computer readable medium of claim 15, wherein the document images of the set of document images are arranged in sequential order, and wherein the data records of the indexed dataset are arranged in sequential order.

17. The non-transitory computer readable medium of claim 16, wherein the operation further includes:

determining a sequential arrangement of the first and second document images;

determining a sequential arrangement of a first data record and a second data record;

determining a sequential arrangement for each of the remaining document images and data records based on the respective determined sequential arrangements of the first and second document images and the first and second data records; and linking the data records with the document images based on the determined sequential arrangements of the data records and document images.

18. The non-transitory computer readable medium of claim 17, wherein the operation further includes:

determining that the indexed dataset is missing a data record or includes a duplicate data record; or determining that the set of document images is missing a document image or includes a duplicate document image; and adjusting the sequential order of the corresponding indexed dataset or set of document images based on the determination.

* * * * *